US006915012B2

(12) United States Patent
Osborne et al.

(10) Patent No.: US 6,915,012 B2
(45) Date of Patent: Jul. 5, 2005

(54) SYSTEM AND METHOD OF STORING DATA IN JPEG FILES

(75) Inventors: John Osborne, Incline Village, NV (US); David W. Russell, Incline Village, NV (US)

(73) Assignee: Soundpix, Inc., Incline Village, NV (US)

(*) Notice: Subject to any disclaimer, the term of this patent is extended or adjusted under 35 U.S.C. 154(b) by 632 days.

(21) Appl. No.: 10/103,443

(22) Filed: Mar. 19, 2002

(65) Prior Publication Data

US 2003/0035585 A1 Feb. 20, 2003

Related U.S. Application Data

(60) Provisional application No. 60/365,203, filed on Mar. 15, 2002, and provisional application No. 60/277,609, filed on Mar. 19, 2001.

(51) Int. Cl.[7] .................................................. G06K 9/36
(52) U.S. Cl. ........................ 382/232; 382/233; 382/240; 382/246
(58) Field of Search ................................ 382/232, 233, 382/244, 245, 246, 247, 248, 240; 345/503, 520, 559; 712/229, 32, 33; 341/50; 360/40, 48, 53; 348/231.99, 552; 714/746, 748, 751; 707/203, 3

(56) References Cited

U.S. PATENT DOCUMENTS

| | | | |
|---|---|---|---|
| 5,032,918 A | 7/1991 | Ota et al. ................ 348/231.4 |
| 5,276,866 A | 1/1994 | Paolini ....................... 725/114 |
| 5,440,677 A | 8/1995 | Case et al. ............... 715/500.1 |
| 5,581,481 A | * 12/1996 | Weerackody et al. ......... 341/50 |
| 5,644,557 A | 7/1997 | Akamine et al. ............. 369/14 |
| 5,671,156 A | * 9/1997 | Weerackody et al. ......... 714/52 |
| 5,815,201 A | 9/1998 | Hashimoto et al. ...... 348/231.4 |
| 5,818,369 A | 10/1998 | Withers ...................... 341/107 |

(Continued)

FOREIGN PATENT DOCUMENTS

EP 0 964 304 A1 12/1999 .......... G03D/15/00

OTHER PUBLICATIONS

Shneier et al., "Exploiting the JPEG Compression Scheme for image Retrieval", IEEE Transactions on Pattern Analysis and Machine Intelligence, vol. 18, No. 8, Aug. 1996. pps. 849–853.*

Soundpix, Inc., "Soundpix—Products—Overview," p. 2, Computer Print Out.

Primary Examiner—Anh Hong Do
(74) Attorney, Agent, or Firm—Ian F. Burns

(57) ABSTRACT

The present invention comprises a system for communicating image data and other data. The system comprises a JPEG file having a JPEG data, at least one non-JPEG data, and a computer. The computer is programmed to read a predetermined number of sequential bytes of the non-JPEG data. The computer is also programmed to determine position of each byte in the sequential bytes that contain a JPEG marker and determine a locator byte, which is capable of indicating the position of any bytes in the sequential bytes that contain a JPEG marker. The computer is further programmed to write the locator byte in the JPEG file and write encoded bytes in the JPEG file. The computer writes the encoded bytes in the JPEG file in a manner wherein, for each byte in the sequential bytes, if the byte does not contain a JPEG marker, each byte is replaced with a bit, preferably written as 0, in the order of the byte's occurrence in the sequential bytes. If the byte does contain a JPEG marker, the byte containing a JPEG marker is replaced with a place holder bit, preferably written as 1 and in the order of the byte's occurrence in the sequential bytes.

46 Claims, 9 Drawing Sheets

U.S. PATENT DOCUMENTS

| | | | |
|---|---|---|---|
| 5,825,830 A | 10/1998 | Kopf | 375/340 |
| 5,911,776 A | 6/1999 | Guck | 709/217 |
| 5,951,646 A | 9/1999 | Brandon | 709/231 |
| 6,102,505 A | 8/2000 | McIntyre et al. | 347/2 |
| 6,134,695 A | 10/2000 | Sasaki et al. | 714/752 |
| 6,188,831 B1 | 2/2001 | Ichimura | 386/69 |
| 6,226,449 B1 | 5/2001 | Inoue et al. | 240/628 |
| 6,229,927 B1 | 5/2001 | Schwartz | 382/248 |
| 6,229,953 B1 | 5/2001 | Ejima et al. | 386/96 |
| 6,243,481 B1 | 6/2001 | Tao | 382/11 |
| 6,310,647 B1 * | 10/2001 | Parulski et al. | 348/231.99 |
| 6,334,023 B1 | 12/2001 | Bruls | 386/54 |
| 6,349,194 B1 | 2/2002 | Nozaki et al. | 434/308 |
| 6,351,600 B1 | 2/2002 | Oeda et al. | 386/96 |
| 6,414,687 B1 * | 7/2002 | Gibson | 345/503 |
| 2001/0009607 A1 | 7/2001 | Ejima et al. | 159/10 |
| 2001/0028404 A1 | 10/2001 | Fukuhara et al. | 68/88 |
| 2001/0033674 A1 | 10/2001 | Chen et al. | 127/641 |
| 2002/0001395 A1 | 1/2002 | Davis et al. | 126/1 R |
| 2002/0006228 A1 | 1/2002 | Suzuki et al. | 460/46 |
| 2002/0007273 A1 | 1/2002 | Chen | 239/157 |
| 2002/0009209 A1 | 1/2002 | Inoue et al. | 279/77 |
| 2002/0021304 A1 | 2/2002 | Eguchi | 185/29 |

* cited by examiner

Figure 4

| STEP | MASK | DATA | RESULT |
|---|---|---|---|
| 1 | 0100 0000 | 0x01 | 0000 0000 |
| 2 | 0010 0000 | 0x22 | 0000 0000 |
| 3 | 0001 0000 | 0x45 | 0000 0000 |
| 4 | 0000 1000 | 0xE0 | 0000 0000 |
| 5 | 0000 0100 | 0xFF | 0000 0100 |
| 6 | 0000 0010 | 0xAB | 0000 0100 |
| 7 | 0000 0001 | 0xFF | 0000 0101 |

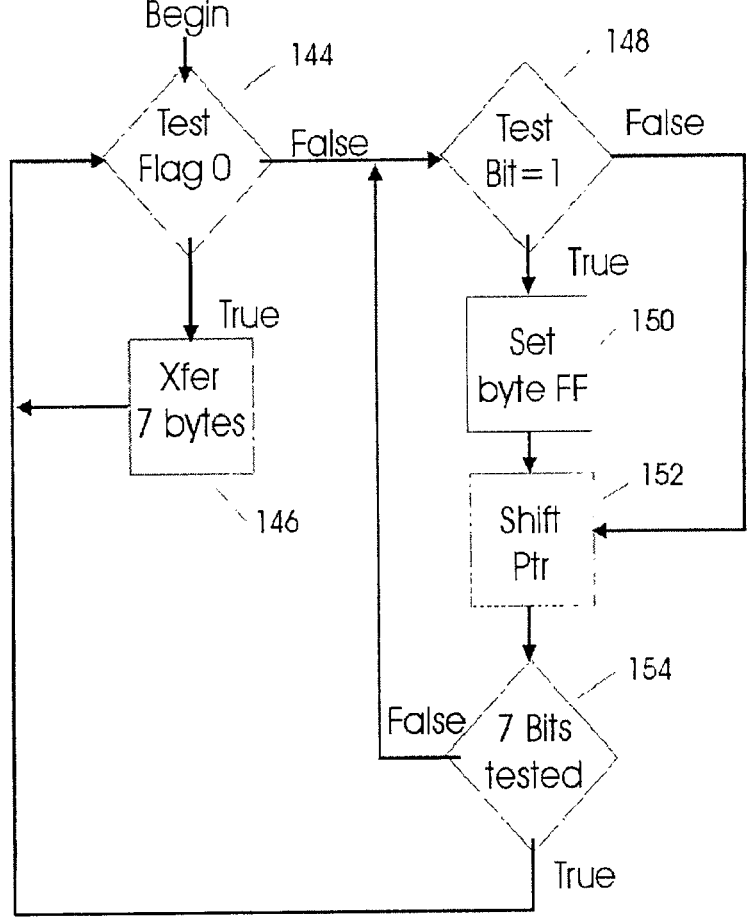

SYSTEM AND METHOD OF STORING DATA IN JPEG FILES

CROSS REFERENCES TO RELATED APPLICATIONS

This application claims the benefit of and incorporates by reference, U.S. provisional application No. 60/365,203, filed on Mar. 15, 2002, and U.S. Provisional application No. 60/277,609, filed Mar. 19, 2001.

BACKGROUND OF THE INVENTION

1. Field of Invention

The present invention relates to a system and method for storing data in JPEG files.

2. Description of Related Art

JPEG Files

JPEG is a file format standard used for compressing, storing, and transmitting digital image data. As used herein, the term "JPEG" refers to all versions, revisions, and releases of the format, including "JPEG" and "JPEG 2000." The format was developed by the Joint Photographic Experts Group and it is currently the most popular and widely used image format One of JPEG's advantages is that it provides the greatest compression of any bitmap format in common use, allowing devices and users to store image files using the least amount of storage space. This compression capability is also one of the features that have made JPEG the most commonly used format for sending pictures over the Internet. Users can transmit and receive images in JPEG more quickly with a higher degree of image quality than in many other formats.

The JPEG format uses markers to break files into segments. Markers comprise a first byte having the value 0xFF. JPEG markers can be grouped into two general types; stand-alone and data. A stand-alone maker has no data other than the two bytes of the marker. A data marker is immediately followed by two bytes that indicate the number of bytes of data that follow the marker. For example, a data marker may appear as follows:

0xFF 0xNN 0xCH 0xCL

In this example, 0xFF indicates the beginning of a JPEG segment or field, 0xNN denotes the type of field, and 0xCH and 0xCL together indicate the length of the field. The marker may be followed by data or instructions.

In addition to data for the subject image, JPEG allows non-JPEG data or application data to be stored within a JPEG file. The application data may comprise data for applications other than an application that uses image data. For example, data may be inserted into a JPEG file that indicates the setting of the camera that captured the image or the identity of the artist who created the image. In this way, one of the advantages of the JPEG format is that data other than the subject image data can be stored and transmitted in the JPEG file itself.

Embedding random data into a JPEG file offers many practical uses. For example, still images or pictures may be transmitted over the Internet with an accompanying audio file, which may be a person's voice describing the picture. This allows families to share pictures with a family member's voice, realtors to present pictures of a property with a voice description of the property, medical professionals to present diagnostic images with a verbal description or diagnosis, and many other uses.

However, one of the problems associated with storing application data in a JPEG file is the application data cannot contain marker codes. In some instances, decoders can read 0xFF in application data as a JPEG marker and cause irrecoverable failure of the decoding process. If application data in a JPEG file contains a marker code, the marker may cause the JPEG decoder to crash and the file may not be useable.

One solution to this problem is to remove all instances of 0xFF or other marker code from the application data. This would allow the data to be stored and transported in a JPEG file without the danger of crashing the JPEG decoder. However, if one or more marker codes are removed from the application data, the data is usually significantly altered and it cannot be used by its intended application program.

Therefore, a need exists for a system and method for removing marker codes from application data while the data is stored in a JPEG file and for returning the data to its original state for use with an application program.

Association of Audio and Image Files

Techniques exist for associating random data with JPEG files. For example, users wishing to create digital images with sound can attach a separate audio, e.g., .wav, file to their image file. However, .wav files break down often in that they are easily corrupted or detached during transmission and storage. Another problem with .wav files is that they require special software to be saved and used, such as Microsoft® Media software.

Other techniques for associating random data with JPEG files include techniques disclosed in U.S. Pat. No. 5,032,918, issued to Ota et al., and U.S. Pat. No. 5,815,201, issued to Hashimoto et al., wherein audio and image files are recorded separately and associated with each other. One of the disadvantages with the invention disclosed in Ota et al. is the necessity of maintaining two separate files. This can be very burdensome and vulnerable to loss of association, especially when high volumes of files are involved or when files are archived for long periods of time.

U.S. Pat. No 6,102,505 issued to McIntyre et al. creates permanent associations between image and audio data by using invisible ink. U.S. Pat. No. 5,644,557 issued to Akamine et al. and European Patent Application number EP 0 964 304 A1 issued to Nozaki et al. disclose magnetic recording on a film stock and recording data as optical pixels on a film stock, respectively. One of the problems associated with Akamine et al. and Nozaki et al. is the requirement of a physical film stock for storing a hard copy of the audio data, which is not well suited for digital image data.

Other storage techniques for audio and image data include the invention disclosed in U.S. Pat. No. 5,276,866, issued to Paolini, wherein audio data is stored as image frames in a video stream, which is then compressed. U.S. Pat. No. 5,440,677, issued to Case et al., discloses storing audio files and image files on CD-ROM with additional files to enable associated playback. The problem with Paolini and Case et al., as well as with the above patents, is they require custom programs for both sending and receiving the data before any of the data can be retrieved, displayed, or played.

In sum, a need exists for eliminating file maintenance requirements inherent in associating application data with image data. A need also exists for creating permanent associations with application data and image data in a manner that allows efficient and convenient transmission through a variety of mediums, such as the Internet. A further need exists for efficiently and conveniently combining application data and image data into a single file. A need further exists for storing application data with image data without requiring custom or non-widely used applications for storing, retrieving, displaying, or using application and image data. The present invention provides a system and method that fulfills these needs by approaching the problem in a way that is not suggested by the prior art.

SUMMARY OF INVENTION

Advantages of the Invention

An advantage of the present invention is that it allows reliable storage of application data with image data.

Another advantage of the present invention is that it allows application data that may conflict with image decoders to be stored with image data.

Another advantage of the present invention is that it eliminates maintenance requirements inherent in associating application data files with image data files.

Another advantage of the present invention is that it provides a system and method where image data and application data are combined into a single file in a manner that allows application programs to detect the existence of the application.

Another advantage of the present invention is that it prevents irrecoverable failure of JPEG decoders when the decoders read application data that contain 0xFF data.

Another advantage of the present invention is that it removes instances of marker codes while at the same time providing data containing order, security, and identification data to enable reliable reconstruction of the original application data.

Another advantage of the present invention is that it provides a system and method for storing application data with image data without requiring custom or non-widely used applications for storing, retrieving, displaying, or using application and image data.

Another advantage of the present invention is that it provides a decoding mechanism wherein application data may be reconstructed.

Another advantage of the present invention is that it provides an encoding mechanism that inserts additional data records at the beginning of each JPEG application record.

Another advantage of the present invention is that it allows multiple non-application data to be permanently associated with at least one image file.

Another advantage of the present invention is that it encodes original data without losing data.

Another advantage of the present invention is that it preserves original data, including additional information, such as playback parameters, language identification, multiple track information, timing, and the like, during encoding of original data.

Another advantage of the present invention is that allows computers to access image data even if the receiving system ignores application data.

Another advantage of the present invention is that it provides digital images with sound.

Another advantage of the present invention is that it provides a means for storing application in an image file in a manner that provides security against modified application data.

Another advantage of the present invention is that it provides a marker in an image file that allows reliable reconstruction of application data.

Another advantage of the present invention is that it provides a means for storing data in an image file that is larger than a maximum field length for the image file.

Another advantage of the present invention is that it provides a means for storing data in an image file usable by playback applications.

These and other advantages of the present invention may be realized by reference to the remaining portions of the specification, claims, and abstract.

BRIEF DESCRIPTION OF THE INVENTION

The present invention comprises a system for communicating image data and other data. The system comprises a JPEG file having a JPEG data, at least one non-JPEG data, and a computer. The computer is programmed to read a predetermined number of sequential bytes of the non-JPEG data. The computer is also programmed to determine position of each byte in the sequential bytes that contain a JPEG marker and determine a locator byte, which is capable of indicating the position of any bytes in the sequential bytes that contain a JPEG marker. The computer is further programmed to write the locator byte in the JPEG file and write encoded bytes in the JPEG file. The computer writes the encoded bytes in the JPEG file in a manner wherein, for each byte in the sequential bytes, if the byte does not contain a JPEG marker, each byte is replaced with a bit, preferably written as 0, in the order of the byte's occurrence in the sequential bytes. If the byte does contain a JPEG marker, the byte containing a JPEG marker is replaced with a place holder bit, preferably written as 1 and in the order of the byte's occurrence in the sequential bytes.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 4 is substantially an example showing a portion of the encoding process of the present invention.

FIG. 6 is substantially an example of a JPEG file in hexadecimal format.

FIG. 7 is substantially an example of a JPEG file with encoded application data according to the present invention.

FIG. 8 is substantially an example of a JPEG file with multiple encoded application segments according to the present invention.

FIG. 9 is substantially a portion of the decoding process of the present invention.

DESCRIPTION OF THE PREFERRED EMBODIMENT

Figure 1:
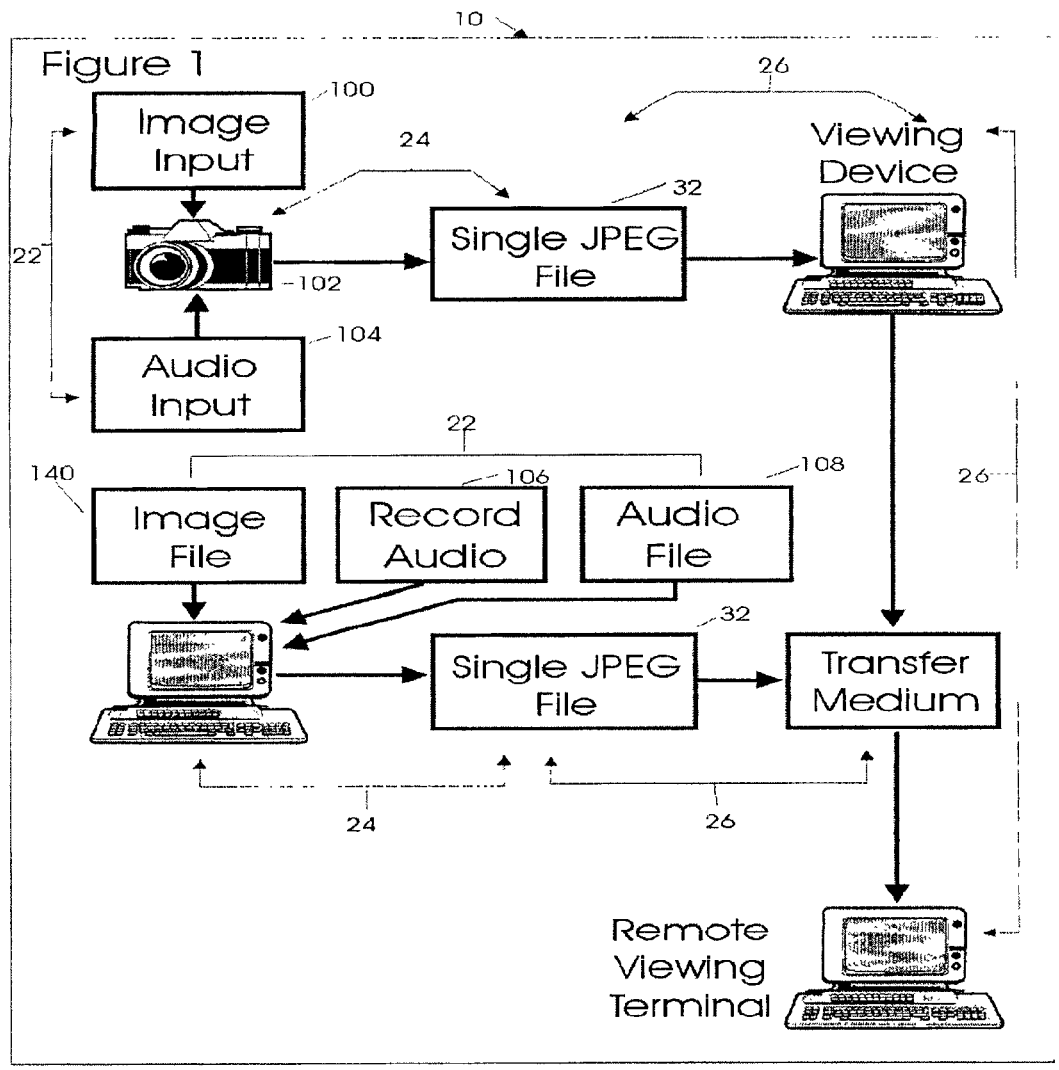
FIG. 1 is substantially a schematic diagram of the system and method of the present invention.

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

The present invention comprises a system and method for storing application data with image data, generally indicated by reference number 10. The method generally comprises gathering image and application data 22, creating a single a single JPEG file 24, and presenting and/or using the image data and application data 26.

Gathering Input Data

Input data comprises image data 100 and application data 104. In one use of the present invention, application data 104 comprises audio files. Other application data may include, text, word processing documents, email messages, spreadsheets, personnel files, fingerprints, etc. The application data may be in any digital format known in the art.

In the example shown on the top of FIG. 1, the device used to gather the image data and application data is a digital camera 102. Image file input 100 is preferably stored in JPEG compression format. Camera 102 comprises equipment for recording sounds in digital data, such as a microphone, an analog-to-digital converter, processor, and memory.

Once image file 100 and audio file inputs 104 are obtained, input files are converted to a single JPEG file 32.

Application Data Encoding

Figure 2:
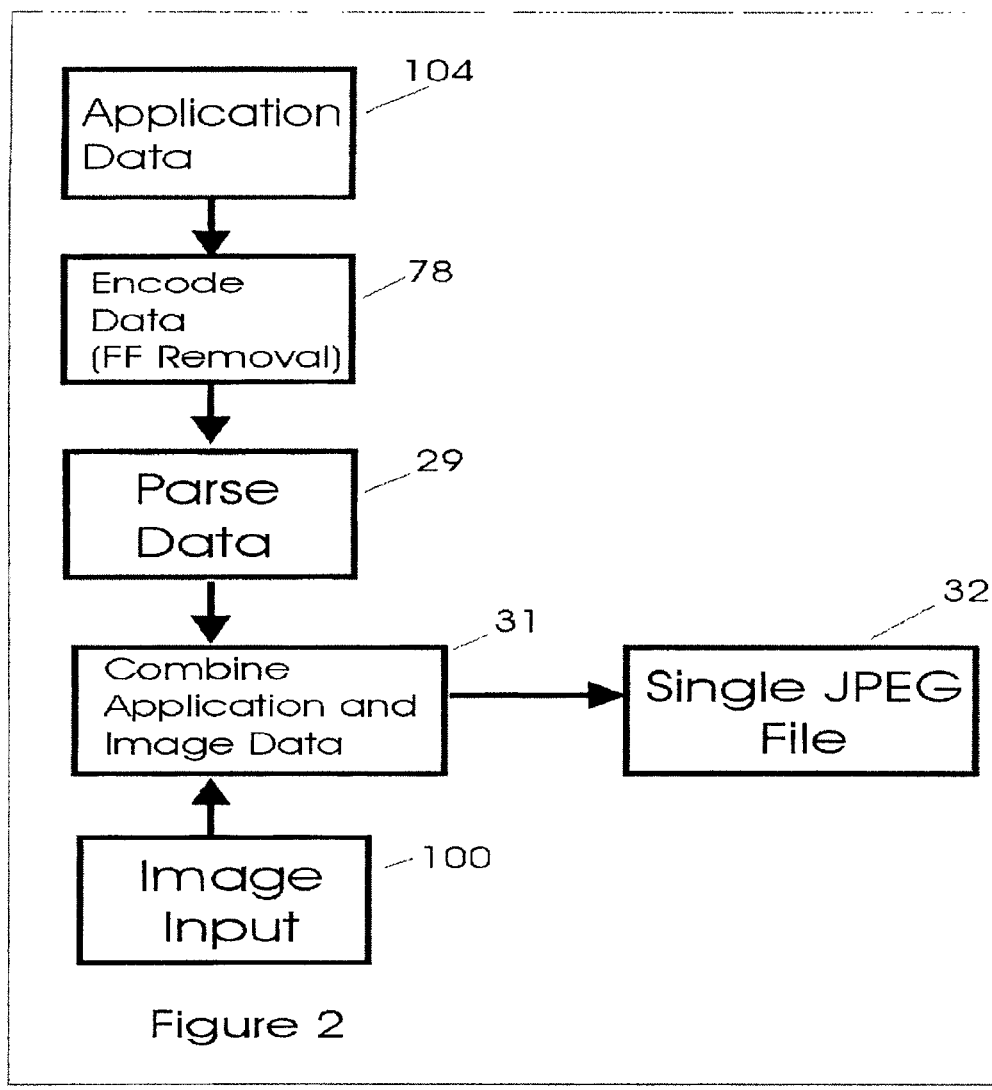
FIG. 2 is substantially a schematic diagram showing creation of a JPEG file containing image and application data.

As shown in FIG. 2, combining image file 100 and application data 104 to a single JPEG file 32, encoding the application data 28, parsing the data 29, if necessary, combining the encoded application data with the image data 31 to form a single JPEG file with embedded encoded application data 32. The step of encoding the application data 28 generally comprises determining the location of any bytes in the un-encoded application data that contain a 0xFF byte, determining at least one locator byte that indicates the location of any 0xFF bytes, and removing the 0xFF bytes from the data.

Figure 3:
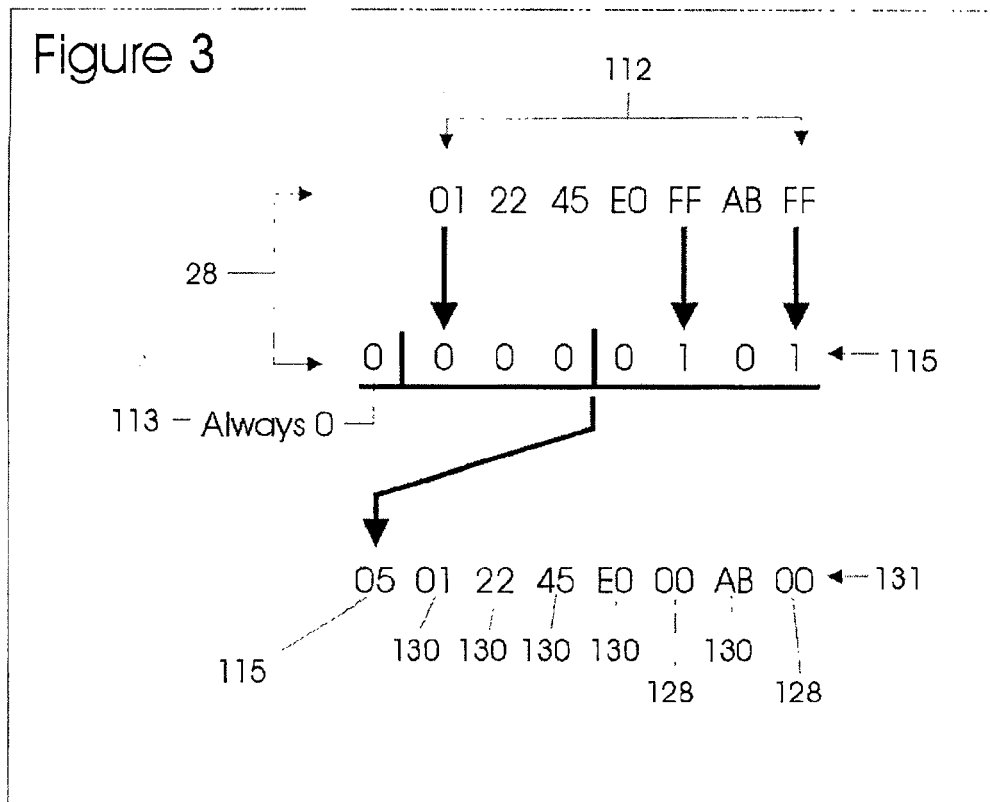
FIG. 3 is substantially an example showing a portion of the encoding process of the present invention.

Referring to FIG. 3, the encoding process of the present invention begins by evaluating a predetermined number of sequential bytes of the data. In the preferred embodiment, seven bytes 112 of sequential data are evaluated from the application data file 104. A locator byte 115 is added to seven sequential bytes 112. To simplify decoding, the locator byte precedes the seven sequential bytes in file storage. Locator byte 115 is used to indicate the position within the seven sequential bytes before encoding that comprise a 0xFF byte. Locator byte 115 and the seven sequential bytes are combined to form an eight byte packet 131.

Figure 5:
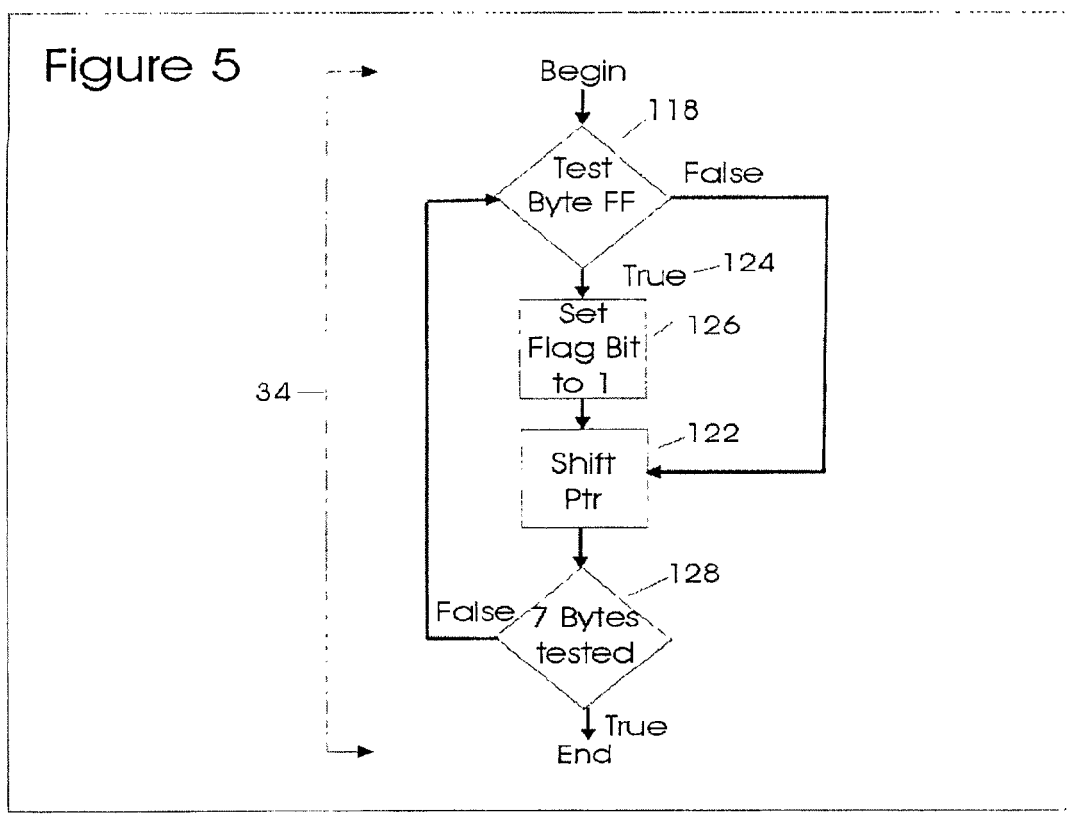
FIG. 5 is substantially a flow chart showing 0xFF detection process of the present invention.

FIGS. 4 and 5 illustrate one method by which the value of the locator byte 115 may be determined. In this method, a mask value 116 is assigned to each byte position in the seven sequential bytes. Most significant bit 113 of mask value 116 is preferably zero to ensure that locator byte 115 does not become 0xFF. The algorithm first tests the first byte to determine if it comprises a 0xFF byte 120. If it does not contain this byte value, the test result is false and the pointer is shifted to the next byte position 122. In the example shown in FIGS. 3 and 4, the first byte is 0x01. Therefore, the test is false and the pointer is moved to the second byte and the result is 0000 0000. Since the second byte is 0x22, the pointer is shifted to the third byte and the result remains 0000 0000.

This test and shift process is repeated until either a byte tests true or all seven bytes have been tested 128. In the example show in FIGS. 3 and 4, the pointer would be shifted to the fifth position before the test result is true. When the test is true, the algorithm sets a flag bit to 1 126 in a position indicated by mask 116. Therefore, the result 117 is 0000 0100. At the sixth byte position, the test is false and the result does not change. At the seventh byte position, the test is true, and the result becomes 0000 0101. This result is used as the value of the locator byte 115, which, in this example, corresponds to 0x05 in hexadecimal format. If none of the seven sequential bytes contained a 0xFF byte, the value of the locator byte would be 0x00.

Referring to FIG. 3, once the value of locator byte 115 is determined, the locator byte is combined with the sequential bytes 112 of application data. However, any bytes that comprise 0xFF are converted to 0x00, a predetermined place holder byte 128. Any bytes that do not comprise a 0xFF, remain the same 130. Together, these eight bytes form an encoded packet of application data 131.

Having removed 0xFFs and having provided a locator byte, file corruption due to presence of 0xFFs is avoided and, at the same time, integrity of original data is preserved. Of course, different numbering systems may be used or different algorithms may be used to determine the value of locator byte 115. Such modifications are within the scope of the present invention.

With regards to image data 100, the image data may be encoded using the JPEG methods, such as Discrete Cosine Transform (DCT) and Huffman encoding.

Insertion of Encoded Packet into JPEG File

Figure 6:
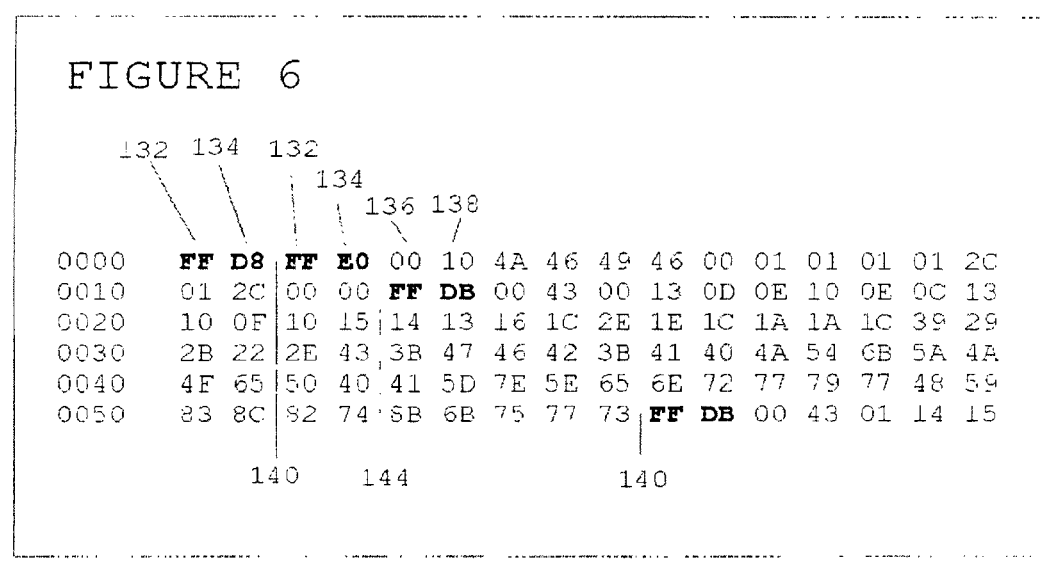
Figure 7:
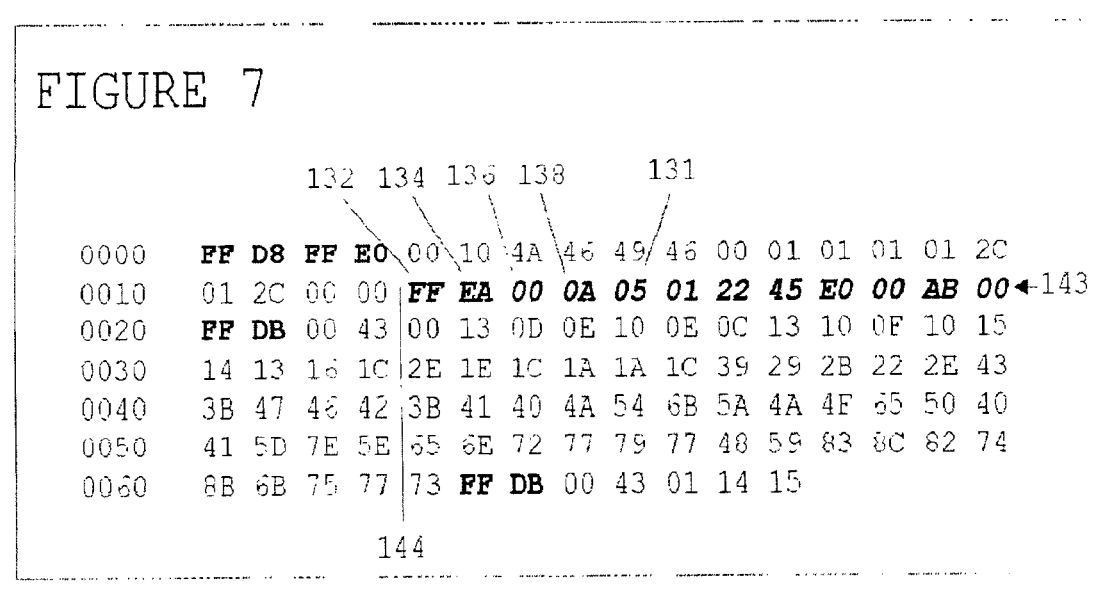

After encoding, encoded packet 131 is inserted in a location in the image file to create a single JPEG file. Referring to FIG. 6, JPEG records follow the format where the first byte is an FF (132), the second is a header type byte (134), the third (136) and fourth bytes (138) are combined to form a 16-bit length of record including length bytes. Encoded packet 131 may be inserted between existing JPEG packets 140, 144. As seen in FIG. 7, A new JPEG packet 143 comprising of JPEG header 132, application header type 0xEA 134, a length of ten bytes 136, 138, and eight byte encoded application data packet 131 is inserted between two existing JPEG packets 140 (see FIG. 6), 144.

A person skilled in the art would appreciate that a mechanism must be implemented whereby the data may be reconstructed in the proper order if it exceeds a 65,535-byte segment length limit imposed by the JPEG format. A person skilled in the art would also appreciate that systems reading the application data must be able to reliably detect the existence of the data even if other applications use the same header code. This is true especially considering JPEG allows sixteen application codes to be used, but JPEG2000 allows only one.

The present invention addresses these concerns by inserting additional data records at the beginning of each JPEG application record. These headers contain order, security, and identification data to enable reliable reconstruction of the original application file. Additional header information further serves to enable detection of the embedded data file, provide traceability of any modification to the original data, and provide information usable by playback applications. Additional headers may be in form of data storage structures, hereinafter referred to as blocks. Block types are preferably removed of FF codes at least after the first 12 bytes to ensure data remains compliant with JPEG specification and does not corrupt JPEG data. Designation of bytes and number of bytes reserved for each block may of course be varied according to programming objective. Referring now to table 1, an index block is shown.

TABLE 1

| Byte | Description | Values |
|---|---|---|
| 1–4 | JPG Header, Header Type, and Size (this is JPG Specific information) | |
| 5–12 | ASCII value of the word "SOUNDPIX" | SOUNDPIX |
| 13–14 | Number of data blocks to follow | |
| 15–16 | Version. This is the version of encoder | Byte 15 is an 8-bit major version number. Byte 16 is an 8-bit minor version number. |
| 17 | Watermark flag | 0 = none;  1 = Digimarc; 2 = Signum; 3 = SoundPix. |
| 18 | Encryption Flag | 0 = none;  1 = RSA. |
| 19 | Registered Flag | If TRUE (1), signifies that this file was created with a registered version of an Encoder Tool |
| 20–21 | Profile Information (Reserved for later use) | |
| 22–24 | Reserved for later use | |
| 25–N | Extended File Information | |

Index block contains global information that is applicable for the entire file. Bytes 1–12 allow automatic detection of the inserted data. Placing the ASCII string within the record (Bytes 5–12) makes it easy for playback applications to identify an audio/image file when viewing the file in an editor. If the playback application does not find the identification record, the image is displayed normally. If the audio ID is detected, then the audio data is read from the header and reconstructed as a simple audio file. The image is displayed without removal of the audio data. Because the 0xFF's have been removed, all current decompression systems can identify the audio packets as application data and skip them without affecting the image display.

Security and digital watermark may be added to the packets (Bytes 17 and 18) such that any alteration of the combined image and data document would be flagged as an error. This feature allows use of data as an encryption key, which may be practical for creating authentic police reports, investigative work, detective work, or using photos for evidentiary purposes.

Bytes 20–21 and 22–24 are optional and may be reserved to accomplish future programming objectives. Bytes 25–N represent extended information that allow specific applications, which are capable of understanding the information, to process the information. The flag byte for extended file information is preferably a 0xFE to signify beginning of extended information. Second byte is preferably a length field and does not include 0xFE or 0xFF. Extended information preferably contains length indicator to allow applications, which cannot understand information, to skip data as well as an identifier to indicate type of information to follow. Table 2 shows various extended file information type identifiers. All identifiers are preferably preceded by the 0xFE extended information tag and a length indicator.

TABLE 2

| ID | Description | Parameters |
|---|---|---|
| 01 | Audio Language Formats | 1 byte following the ID, giving the count of language formats present. |
| 02 | Text Language Formats | 1 byte following the ID, giving the count of language formats present. |
| 03 | Audio Language Format | 1-byte followed by the RFC-1766 Language code. This EFI Type is used to indicate all languages present in a given File. If there are multiple audio languages present, the file should contain a 03 record for each language. |
| 04 | Text Language Format | 1-byte followed by the RFC-1766 Language code. This EFI Type is used to indicate all languages present in a given File. If there are multiple text languages present, the file should contain a 04 record for each language. |

For example, assume multiple language file is involved. An EFI Type ID of 01 would indicate multiple languages embedded in the file. A type of 0x01 would indicate following byte describes the number of different language formats present in the file. Thus, Extended File Information area for a file with 5 languages would look like: 0xFE 0x02 0x01 0x05. Thus, using extended file information gives the file format the flexibility and extensibility to deal with future additions.

Additional header further comprises header blocks. Header blocks will contain information about any file data that is to be included in the JPEG file. This data include, as examples, audio data and image data for slide shows. Data may also include word processing files, spreadsheets, and other random data. Base 14 bytes for Header Blocks are shown in table 3 below.

TABLE 3

| Byte | Description | Values |
|---|---|---|
| 1–4 | JPG Header, Header Type, and Size (this is JPG specific information) | |
| 5–12 | Data Format Tag (Similar to the SOUNDPIX tag above, but related to the actual type of data stored). For audio information this will be SPXAUDIO, for image information, SPXIMAGE, SPXTRADE, and SPXTHUMB, for text, SPXTEXT, etc. | SPXIMAGE = Image data; SPXTRADE = Trademark Data; SPXTHUMB = Thumbnail Image; SPXAUDIO = Audio data; SPXTEXT = Text data; SPXEXTRA = File data. |
| 13–14 | ID. | This ID may be used to uniquely identify and distinguish audio data headers. It may also used to match header records with their associated data blocks. ID allows for reconstruction of data. |
| 15 | Reserved for later use | |
| 16–34 | Language | Language format codes as specified in RFC-1766 |
| 35 | Audio file format flag | 0 = wav; 1 = au; 2 = AIFF; 3 = MP3 |
| 36–38 | Audio sample rate flag | Unsigned 24-bit sample rate in Hz. |
| 39 | Audio bits/sample | Unsigned 8-bit bits/sample |
| 40 | Display preference flag. This defines such things as looping, auto play or other | 8 bit field: 0x01 = mute; 0x02 = auto play; |

TABLE 3-continued

| Byte | Description | Values |
|---|---|---|
| | effects. | 0x04 = on click; 0x08 = loop; 0x10 = sync (Reserved for later use). |
| 41 | Loop Count | If byte 40 is set to 08, this byte will determine how many times the audio will loop. If set to 0, the audtio will loop continuously. |
| 42–43 | Start time of audio file. | Unsigned 16-bit start delay in deciseconds. Also used for time delay between replays. |
| 44–45 | Data Block Count | This field tells the number of data block that make up the included audio file. |
| 46–57 | Password | Encoded password that requires verification for the audio to be heard. |

The Data Format Tag (bytes 5–12) preferably uses an 8-byte text field to define the type of data to follow. Audio data are preferably represented as SPXAUDIO. Image data are preferably represented as SPXIMAGE, SPXTRADE, or SPXTHUMB. Text data are preferably represented as SPXTEXT. Any unsupported file information are preferably represented as SPXEXTRA and placed in a File Data block. The data format tag also allows for embedding more data types and allows playback systems to know what to do with a given data type. For example, a word document could be embedded into the file with a Data Format Tag of MSWORD®. This would allow the player of the same version or higher to recognize the MSWORD® format tag, and send the data directly to Microsoft Word.

Additional header further comprises image data header shown in table 4 below.

TABLE 4

| Byte | Description | |
|---|---|---|
| 13–14 | ID | The ID Field for this type, as well as the types to follow, serves to uniquely identify and distinguish audio data headers. It may also used to match header records with their associated data blocks. ID allows for reconstruction of data. Preferably, all Ids that are embedded start at 1. 0 will be reserved for the main JPG that contains the data. |
| 15 | Image Format | 0 = Jpeg; 1 = BMP; 2 = TIFF; 3 = GIF. |
| 16 | Image Effect. Image Effects describe different actions that the image can perform or be a part of. It also defines whether or not the image has thumbnail or trademark data associated with it. If the Image effect has the Thumbnail of Trademark bits set, the corresponding ID listed under bytes 23 and 24 for thumbnails and bytes 25 and 26 for trademarks tells where those thumbnail and trademark images may be located. Image format further defines whether the image is part of a slide- | 0x00 = No Effect; 0x01 = Slideshow; 0x02 = Mouse over; 0x04 = Thumbnail; 0x08 = Trademark; |

TABLE 4-continued

| Byte | Description | |
|---|---|---|
| | show, of should be activated based on a user interaction, such as mouse-over. No Effect must be selected for all SPXTRADE and SPXTHUMB types. | |
| 17–18 | Start Time. Used with slideshows to tell when image is to be displayed | Unsigned 16-bit start delay in deciseconds. Also used for time delay between replays. Not used for SPXTRADE and SPXTHUMB types |
| 19–20 | Data Block Count | This field tells the number of data block that make up the included audio file. |
| 21–22 | Associated Image | If the Data Format Tag is set to SPXTRADE or SPXTHUMB, this value represents the ID of Image that the thumbnail or trademark is associated with. If the Data Format Tag is set to SPXIMAGE, this field is not used |
| 23–24 | Thumbnail ID | Only used if the Data Format Tag is set to SPXIMAGE and Image Effect has Thumbnail set. This is the ID of a Thumbnail associated with this image. |
| 25–26 | Trademark ID | Only used if the Data Format Tag is set to SPXIMAGE and Image Effect has Trademark set. This is the ID of a Trademark associated with this image. |

Additional header further comprises File Data Header shown and described in table 5 below.

TABLE 5

| Byte | Description | |
|---|---|---|
| 13–14 | ID | |
| 15 | Mime Type Length (L). Mime Type length defines the length of the Mime Type field. These values are standardized and widely accepted and allow for the most flexibility. Once we have the length, then we can extract the actual mime type and read the file data. | |
| 16 to 16 + L | Mime Type | |
| 17 + L to 18 + L | Data Block Count | This field tells the number of data block that make up the included audio file. |
| 19 + L | File Name Length (FL) | Length in bytes of file name |
| 20 + L to 20 + L + FL | File Name | Name of the file that this header references. |

Additional header also comprises text data header shown and described in table 6 below.

TABLE 6

| Byte | Description |
|---|---|
| 13–14 | ID |
| 15–16 | Associated Image ID. The Associated Image ID in the Text block allows assignment of text to |

TABLE 6-continued

| Byte | Description | |
|---|---|---|
| | several images that might be contained within a file. An example of this is in the case of a slide show, where multiple images will be displayed at different times. If the text is to be assigned to only the main image, then its Associated ID is preferably 0. | |
| 17–35 | Language | Language format codes as specified in RFC-1766 |
| 36–37 | Data Block Count | This field tells the number of data block that make up the included audio file. |
| 38 | Effect | 0x00 = No Effect; 0x01 = Mouse Over; 0x02 = Append to Image; 0x04 = Overlay Image; 0x08 = URL |
| 39–40 | Horizontal Offset for Overlay | If Overlay Image is set, this sets the horizontal starting point for the overlay. |
| 41–42 | Vertical Offset for Overlay | If Overlay Image is set, this sets the vertical starting point for the image. |

Additional headers further comprises user data block shown and described in table 7 below. User Data Block allows users to store various types of information. Specific uses for this field type are envisioned to be user preference information and Meta data, such as image titles. The Description field allows developers to assign a meaningful name to the data stored within this area. The Data field preferably stores the information. All information stored within the Data field is preferably XML formatted. This allows for multiple parameters to be stored within this area and gives users added flexibility for the data being stored. For example, a user storing a title that was "Summer 2001" would have an entry in the data area that was: <Title>Summer 2001</Title>. Using this feature along with the Description field would allow a user to group related data together into one data block and keep it together.

TABLE 7

| Byte | Description | |
|---|---|---|
| 1–4 | JPG Header, Header Type, and Size (this is JPG specific information) | |
| 5–12 | Data Format Tag | SPXUSER |
| 13–14 | ID. This identifier is currently used only as a consistency measure for other blocks. Currently there is no associated data block for user data. This allows for that possibility in future releases | |
| 15 | Description Length (L) | |
| 16 to 16 + L | Description | Text field describing the type of data stored |
| 17 + L to N | Data | |

Additional header further comprises data block. Data Block stores data described in the Header Blocks. As shown and described in table 8 below, using the ID field, in conjunction with the Sequence field, an application can successfully decode the data and know what action to take, based on the information provided by its associated Header Block.

TABLE 8

| Byte | Description | |
|---|---|---|
| 1–4 | JPG Header, Header Type, and Size (this is JPG specific information) | |
| 5–12 | Data Format Tag | SPXDATA |
| 13–14 | ID. This ID will match a Header record so the data can be stored in the proper format. | |
| 15–16 | Sequence. The sequence in the original file that this data block falls into | |
| 17–N | Data. | |

Figure 8:
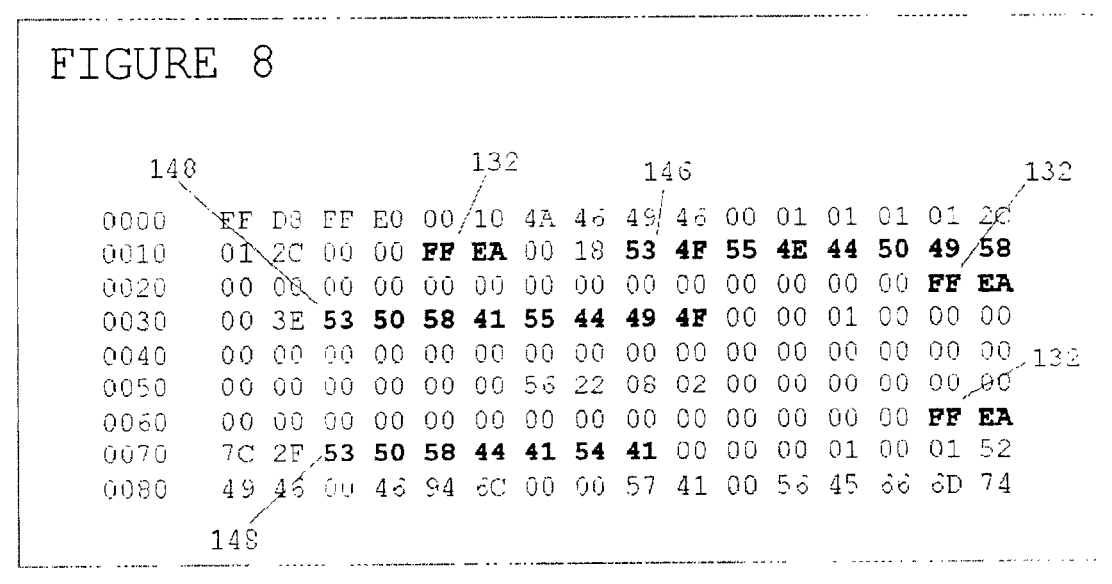

Referring now to FIG. 8, additional headers described in tables 1–8 are inserted into a JPEG file beginning with JPEG application marker 132. In the embodiment shown, additional header is in the form of index header 146 and data format tag 148.

Presenting Files of Different Types as Output

Once a single embedded JPEG file exists, it may be transferred to any playback system 26, preferably a device capable of at least displaying image data such as a personal computer, a personal digital assistant (PDA), a cell phone, a specialized application player such as a talking picture frame, and the like. The file may also be transferred to any camera, display device, or application computer through any electronic media such as disk, e-mail, or other telecommunications medium.

During decoding, playback system 26 detects embedded data, separates it from the JPEG image data, decode it back to original data format, and presents two files as output. FIG. 9 shows decoding method of the present invention. Playback system 26 begins reading encoded data by testing locator byte 115 (144). If locator byte 115 is 0x00, then playback system 26 transfers, without changes, the seven bytes that follow 146. Playback system 26 proceeds to read the rest of data stream. If locator byte 115 is not 0x00, then playback system 26 tests each bit of the locator byte 115 (148). If the bit is 1, then corresponding byte is set to 0xFF (150). If bit is not 1, then playback system 26 proceeds to test the remaining bits until all seven bits are tested (152,154).

Applications of Data Embedded into JPEG

Listed below are just some of the practical applications for random data embedded into JPEG. When random data embedded into JPEG is an audio file, still pictures may be displayed with playable audio files on devices such as computers, PDAs, or cell phones. With still pictures and audio files combined into a single JPEG file, viewers can click on an image to hear description of what is being portrayed by the image. Audio description may be in a form of an advertisement for products from internet auction or catalogue sites, advertisement for a real estate, investigative work, family activity, research, or newsletters. Researchers or investigators can attach audio files to image files thereby allowing their colleagues to listen to their verbal observations or analyses while looking at their work. Images may be in a form of X-ray scans, ultrasound scans, image files generated from specialized devices, any other types of digital images known in the art. Voice and speaker recognition software to identify the speaker may also be included with the present invention to provide a system that allows searching and categorization of images through their audio content. The system of the present invention may be configured to allow a user select between opening a stored thumbnail or stored reduced image and the original image, while also allowing the user to select between playing the original audio, or a reduced version of the audio.

When non-JPEG data comprises multiple sound files, such as multiple speeches in different languages, the present invention allows users to store and play sound in a particular language specified by either the stored profile of the user, the site providing access, or profile based on the most popular language users use. Next, when random data comprises time-related data, multiple images may be stored and played at specific times to coincide with the audio playback. Alternatively, multiple audio files may be played with specific start times. This is most practical in creating slideshows.

Random data such as confidential documents, ID photos, security data, text, other images, personnel files, spreadsheets, or fingerprint biometrics may be combined in one image file to build a paperless record or database.

When random data comprises three-dimensional solid modeling information scanned by laser or other methodology, such random data may be combined with the visual image data stored in the image thereby allowing mapping of the visual image onto the solid model, resulting in more realistic models.

CONCLUSION

The present invention solves many of the problems associated with the prior art. The present invention further provides novel and unique JPEG related applications. The present invention allows reliable storage of random data with an image file. It eliminates maintenance requirements inherent in associating application data with image files. It also prevents irrecoverable failure when computer reads application data containing 0xFF data entries while at the same time provides a header that enables detection of embedded data, allows reliable reconstruction of the original application file, provides information usable by playback applications, and provides traceability of any modifications to the data.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A method of storing non-JPEG data in a JPEG file, comprising:
   (A) reading a predetermined number of sequential bytes of the non-JPEG data;
   (B) determining a position in the sequential bytes of each byte that contains a JPEG marker;
   (C) determining a locator byte, wherein the locator byte is capable of indicating the position of each byte in the sequential bytes that contains a JPEG marker; and
   (D) determining encoded bytes, the encoded bytes comprising:
      (a) the locator byte;
      (b) each byte of the sequential bytes that does not contain a JPEG marker; and
      (c) a place holder byte for each byte of the sequential bytes that comprises a JPEG marker.

2. The method of claim 1, further comprising the step of writing the encoded bytes in a predetermined order.

3. The method of claim 2, wherein the locator byte is written in the most significant position.

4. The method of claim 2, wherein the sequential bytes are written in order of their occurrence in the sequential bytes and the place holder bytes are written in the order of the bytes they replace.

5. The method of claim 2, wherein the encoded bytes are written in the JPEG file.

6. The method of claim 5, further comprising writing an application data marker in the JPEG file before the encoded bytes.

7. The method of claim 1, wherein the predetermined number of sequential bytes is seven.

8. The method of claim 1, wherein the JPEG marker comprises 0xFF.

9. The method of claim 1, wherein the place holder byte comprises 0x00.

10. The method of claim 1, wherein the locator byte is between 0x00 to 0x7F.

11. The method of claim 1, wherein a locator byte of 0x00 indicates that none of the sequential bytes contain a JPEG marker.

12. The method of claim 1, wherein the non-JPEG data comprises sound data.

13. The method of claim 1, further comprising:
   (A) locating an application data marker in the JPEG file;
   (B) writing the encoded bytes into the JPEG file after the application data marker.

14. The method of claim 1, further comprising:
   (A) repeating steps A through D of claim 1 for all of the non-JPEG data;
   (B) determining a total number of encoded bytes;
   (C) if the total number of encoded bytes exceeds a maximum JPEG field length:
      (a) dividing the encoded file into segments, the number of bytes in each segment being less than the maximum JPEG field length; and
      (b) writing the segments into the JPEG file.

15. The method of claim 13, further comprising recording the JPEG file with the encoded bytes.

16. The method of claim 13, further comprising transmitting the JPEG file with the locator byte and the encoded bytes.

17. The method of claim 13, further comprising:
   (A) reading the encoded bytes in the JPEG file;
   (B) determining the locator byte;
   (C) determining the location of any place holder bytes in the encoded bytes from the locator byte; and
   (D) changing each place holder byte to a byte containing JPEG markers, thereby decoding the encoded bytes and obtaining the sequential bytes.

18. The method of claim 17, further comprising using the sequential bytes in an application program.

19. The method of claim 17, further comprising recording the sequential bytes.

20. The method of claim 13, further comprising writing control data into the JPEG file, the control data being relevant to the non-JPEG data.

21. A system for communicating image data and other data, comprising:
   (A) a JPEG file, the JPEG file comprising JPEG data;
   (B) non-JPEG data;
   (C) a computer, the computer being programmed to perform the following:
      (a) reading a predetermined number of sequential bytes of the non-JPEG data;
      (b) determining a position in the sequential bytes of each byte that contains a JPEG marker;
      (c) determining a locator byte, wherein the locator byte is capable of indicating the position of each byte in the sequential bytes that contains a JPEG marker;

(d) determining encoded bytes, the encoded bytes comprising:
  (i) the locator byte;
  (ii) each byte of the sequential bytes that does not contain a JPEG marker; and
  (iii) a place holder byte for each byte of the sequential bytes that comprises a JPEG marker; and
(e) writing encoded bytes in the JPEG file, the encoded bytes being written in a predetermined order.

22. The system of claim 21, further comprising a transmission device in communication with the computer, the transmission device being configured to transmit the JPEG file with the encoded bytes.

23. The system of claim 21, further comprising an image data input device in communication with the computer, the image data input device being adapted to provide JPEG data.

24. The system of claim 23, wherein the image data input device comprises digital camera.

25. The system of claim 21, further comprising a non-JPEG data input device in communication with the computer, the non-JPEG data input device being configured to provide non-JPEG data.

26. The system of claim 21, wherein the non-JPEG data input device comprises a sound recording device.

27. The system of claim 21, wherein the computer is further programmed to write the encoded bytes in the JPEG file after an application data marker.

28. The system of claim 21, wherein the computer is further programmed to write control data in the JPEG file, the control data being relevant to the non-JPEG data.

29. The system of claim 21, further comprising a second computer in communication with the computer, the second computer being configured to perform the following:
  (A) read the encoded bytes in the JPEG file;
  (B) determine the locator byte;
  (C) determine the location of any place holder bytes in the encoded bytes from the locator byte; and
  (D) change each place holder byte to a byte containing JPEG markers, thereby decoding the encoded bytes and obtaining the sequential bytes.

30. The system of claim 26, wherein the computer is adapted to use the non-JPEG data.

31. A method of storing non-JPEG data in a JPEG file, comprising:
  (A) reading the non-JPEG data;
  (B) determining which bytes of the non-JPEG data, if any, comprise a predetermined JPEG marker;
  (C) determining encoded bytes, the encoded bytes comprising:
    (a) each of the bytes of the non-JPEG data that do not comprise a JPEG marker;
    (b) a place holder byte for each byte of the non-JPEG data that comprises the predetermined JPEG marker;
    (c) at least one locator byte, the locator byte being capable of indicating which of the encoded bytes are place holder bytes.

32. The method of claim 31, further comprising the step of writing the encoded bytes in a predetermined order.

33. The method of claim 32, wherein the locator byte is written in the most significant position.

34. The method of claim 32, wherein the encoded bytes are written in the JPEG file.

35. The method of claim 34, further comprising writing an application data marker in the JPEG file before the encoded bytes.

36. The method of claim 31, wherein the JPEG marker comprises 0xFF.

37. The method of claim 31, wherein the place holder byte comprises 0x00.

38. The method of claim 31, wherein a locator byte of 0x00 indicates that none of the bytes of non-JPEG data contain a JPEG marker.

39. The method of claim 31, wherein the non-JPEG data comprises sound data.

40. The method of claim 31, further comprising:
  (A) locating an application data marker in the JPEG file;
  (B) writing the encoded bytes into the JPEG file after the application data marker.

41. The method of claim 31, further comprising:
  (A) determining a total number of encoded bytes;
  (B) if the total number of encoded bytes exceeds a maximum JPEG field length:
    (a) dividing the encoded bytes into segments, the number of bytes in each segment being less than the maximum JPEG field length; and
    (b) writing the segments into the JPEG file.

42. The method of claim 34, further comprising recording the JPEG file with the encoded bytes.

43. The method of claim 34, further comprising transmitting the JPEG file with the locator byte and the encoded bytes.

44. The method of claim 34, further comprising:
  (A) reading the encoded bytes in the JPEG file;
  (B) determining the locator byte;
  (C) determining the location of any place holder bytes in the encoded bytes from the locator byte; and
  (D) changing each place holder byte to a byte containing JPEG markers, thereby decoding the encoded bytes and obtaining the sequential bytes.

45. The method of claim 34, further comprising using the non-JPEG bytes in an application program.

46. The method of claim 34, further comprising writing control data into the JPEG file, the control data being relevant to the non-JPEG data.

* * * * *